United States Patent [19]

Shimada

[11] Patent Number: 4,677,292

[45] Date of Patent: Jun. 30, 1987

[54] METHOD OF GENERATING IMAGE SCANNING CLOCK SIGNALS IN AN OPTICAL SCANNING DEVICE

[75] Inventor: Kazuyuki Shimada, Tokyo, Japan

[73] Assignee: Ricoh Company, Ltd., Tokyo, Japan

[21] Appl. No.: 800,721

[22] Filed: Nov. 22, 1985

[30] Foreign Application Priority Data

Nov. 22, 1984 [JP] Japan .................. 59-247445

[51] Int. Cl.$^4$ .............................. H01J 40/14
[52] U.S. Cl. ........................ 250/235; 358/293
[58] Field of Search ............ 250/234, 235, 236; 358/285, 293

[56] References Cited

U.S. PATENT DOCUMENTS 4,600,895  7/1986  Landsman .................. 331/1 A

Primary Examiner—Eugene R. LaRoche
Assistant Examiner—David Mis
Attorney, Agent, or Firm—Oblon, Fisher, Spivak, McClelland & Maier

[57] ABSTRACT

A light beam is cyclically deflected by a rotating light deflector to scan an object such as an information storage medium. The scanning beam is detected by a light sensor located outside of the scanning region for synchronizing primary scanning. A plurality of n clock signals $C_1$ through $C_n$ are successively generated by the delay element from an image scanning clock signal and a reference clock signal having the same frequency as that of the image scanning clock signal. One of the clock signals $C_1$ through $C_n$ is selected as the image scanning clock signal dependent on the output signal from the light sensor. Dependent on the tap-to-tap delay error of the delay element: $\pm\alpha\%$, the maximum error of an image scanning position: 1/N pixel, and the period of the image scanning clock signal: $T_0$, $\Delta t_0$ which meets a prescribed condition is selected as a tap-to-tap delay time of the delay element.

1 Claim, 10 Drawing Figures

F I G. 5
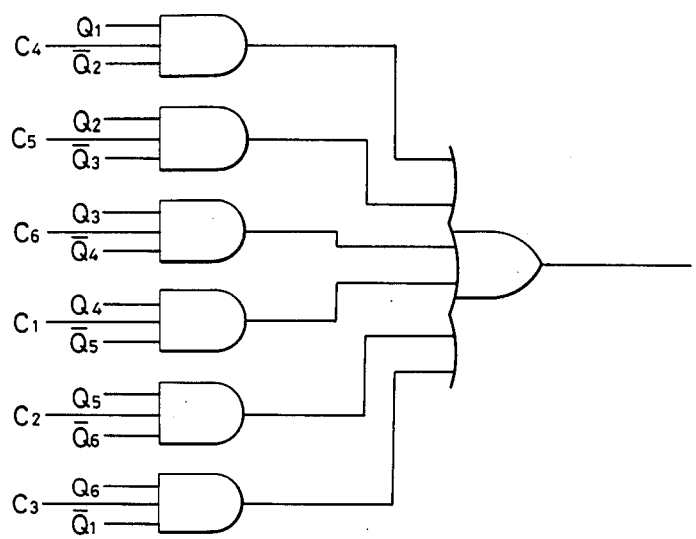
F I G. 6
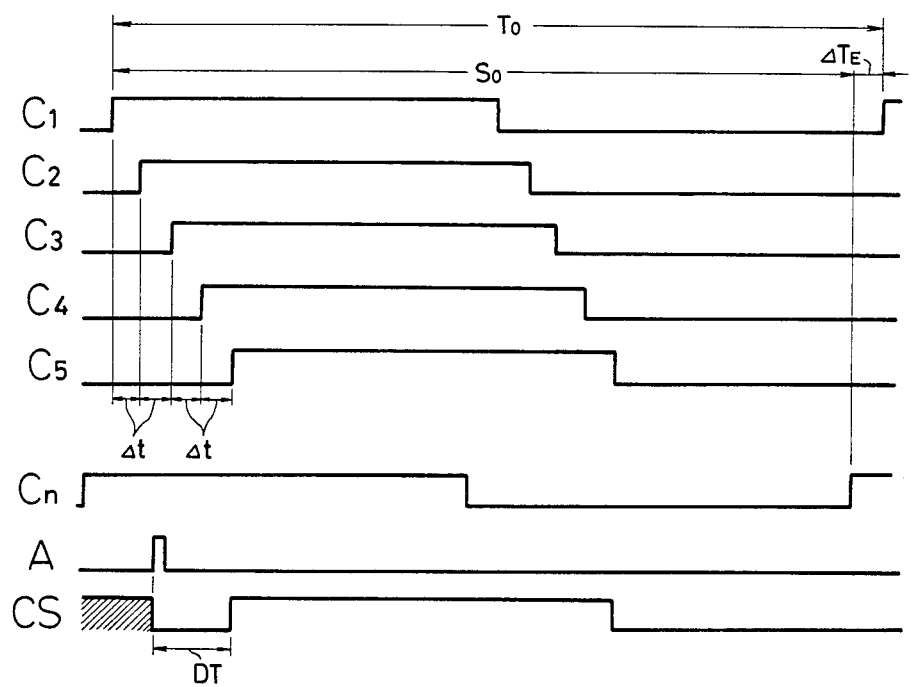

METHOD OF GENERATING IMAGE SCANNING CLOCK SIGNALS IN AN OPTICAL SCANNING DEVICE

BACKGROUND OF THE INVENTION

The present invention relates to a method of generating image scanning clock signals in an optical scanning device.

There have been known optical scanning devices in which a light beam is cyclically deflected by a rotating light deflector such as a rotating polygonal mirror or a hologram grating disc for writing information on or reading recorded information from an object such as an information storage medium.

When the light beam such as a laser beam is deflected by the rotating light deflector into a scanning beam, the scanning beam is focused as a spot on the information storage medium, which may be an original document carrying information to be read out or a photoconductive photosensitive body on which information is to be written or recorded. While the information storage medium is being scanned with the scanning beam spot, the information is read from or written on the information storage medium by the scanning beam spot modulated by an image scanning clock signal at the rate of one pixel per clock pulse.

The scanning of the information storage medium with the scanning beam is referred to as "primary scanning". While the information storage medium is subject to the primary scanning, it is fed in a direction normal to the direction of the primary scanning. This feeding movement of the information storage medium is referred to as "secondary scanning".

As can readily be understood, positions where respective primary scanning cycles are started should be aligned with each other in the secondary scanning direction in order to write and read information properly. If such starting positions for the primary scanning were not aligned in the secondary scanning direction, then an image reconstructed from the read-out signals would be distorted in the readout mode, or an image signal error known as "jitter" would be produced in the write mode.

It has been general practice to align the primary scanning starting positions in the secondary scanning direction by positioning a light sensor outside of the primary scanning region, detecting the scanning beam prior to each of the primary scanning cycles, and synchronizing the primary scanning cycles.

One way of bringing the primary scanning cycles into synchronism is to use an image scanning clock signal. More specifically, the instant the scanning beam is detected by the light sensor, the pulses of the image scanning clock signal start being counted up to a preset number m, for example, and the primary scanning cycle is started from a position in which the pulse number $m+1$ is reached. The image scanning clock signal is continuously generated at all times. The output signal from the light sensor, which serves as a reference for synchronizing the primary scanning cycles, is subject to variations in signal interval due for example to different mechanicam accuracies of the rotating light deflector. Dependent on whether the light sensor output signal is generated when the clock signal is high or low, the time to start the primary scanning cycle can deviate at most one clock pulse from the detection of the scanning beam with the light sensor, resulting in a scanning error.

When the time to start the primary scanning cycle deviates at most one clock pulse from the detection of the scanning beam with the light sensor, the primary scanning starting position varies at most one pixel. There is a method capable of reducing the largest variation of the primary scanning starting position to a 1/N pixel (N is a natural number), and this method will hereinafter be referred to as a "1/N method".

To carry out the "1/N method", on which the present invention is based, a delay element is required, and it is theoretically assumed that the delay element has no delay error between its taps, or no tap-to-tap delay error.

If there were no delay error between the taps of the delay element, the value N could be as large as desired, and the variation of the primary scanning starting position would theoretically be reduced to as small an extent as desired. However, since there is always a tap-to-tap delay error in an actual delay element, the value of N is at most 3 in the presence of such a tap-to-tap delay error.

SUMMARY OF THE INVENTION

It is an object of the present invention to provide a method of generating image scanning clock pulses in an optical scanning device, the method being based on the 1/N method and capable of effectively reducing any variation in primary scanning starting positions in view of a tap-to-tap delay error of a delay element.

According to the present invention, a delay element is used which has a tap-to-tap delay error $\alpha(\%) \leq 33$. The tap-to-tap delay error can experimentally be predetermined.

A light beam is cyclically deflected by a rotating light deflector to scan an object such as an information storage medium. The scanning beam is detected by a light sensor located outside of the scanning region for synchronizing primary scanning.

A plurality of n clock signals $C_1$ through $C_n$ are successively generated by the delay element from an image scanning clock signal and a reference clock signal having the same frequency as that of the image scanning clock signal. One of the clock signals $C_1$ through $C_n$ is selected as the image scanning clock signal dependent on the output signal from the light sensor. The phase difference between the clock signals $C_1$ through $C_n$ is established as a tap-to-tap delay time $\Delta t_0$ of the delay element. Because of a tap-to-tap delay error, the actual phase difference $\Delta t$ is not constant but varies. It is assumed that the period of the image scanning clock signal is expressed as $T_0$ and the maximum positional error of a primary scanning starting position is a 1/N pixel where N is a natural number.

In view of the presence of the error $\alpha$, $\Delta t_0$ or successive phase delays of the clock signals $C_1$ through $C_n$ at the time $\alpha=0$, are of significance as designing values. According to the present invention, a most appropriate value for $\Delta t_0$ is selected dependent on $\alpha$, $T_0$, and 1/N as follows:

The value of $\Delta t_0$ which meets:

$$\frac{\left(1 - \frac{1}{N}\right) T_0}{\left(1 - \frac{\alpha}{100}\right)(n-1)} \leq \Delta t_0 \leq \frac{\left(1 + \frac{1}{N}\right) T_0}{\left(1 + \frac{\alpha}{100}\right)(n+1)} \quad \text{(i)}$$

-continued when $$\frac{100 + n\alpha}{100n + \alpha} \leq \frac{1}{N} < \frac{2}{n-1}$$

in the range of $5 \leq n \leq 2+(100/\alpha)$, and $$\frac{\left(1 - \frac{1}{N}\right) T_0}{\left(1 - \frac{\alpha}{100}\right)(n-1)} \leq \Delta t_0 < \frac{T_0}{\left(1 + \frac{\alpha}{100}\right)(n-1)}$$

when $$\frac{2}{n-1} \leq \frac{1}{N}$$

in the range of $5 \leq n \leq 2+(100/\alpha)$, and (ii)

$$\frac{\left(1 - \frac{1}{N}\right) T_0}{\left(1 - \frac{\alpha}{100}\right)(n-1)} \leq \Delta t_0 < \frac{T_0}{\left(1 + \frac{\alpha}{100}\right)(n-1)}$$

when $$\frac{2\alpha}{\alpha + 100} \leq \frac{1}{N} < 1,$$

is selected as the tap-to-tap delay time of the delay element.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 2 through 5 are diagrams explanatory of the 1/N method serving as the basis for the present invention; and FIG. 6 is a diagram explanatory of the method of the present invention.

DESCRIPTION OF THE PREFERRED EMBODIMENT

The present invention is based on the 1/N method. Therefore, the 1/N method will first be described in detail with reference to FIGS. 2 through 5.

In the 1/N method, n clock signals $C_1$ through $C_n$ with their phase differences delayed successively by $\Delta t_0$ are produced by a delay element from an image scanning clock signal and a reference clock signal of the same frequency as that of the image scanning clock signal, the phase difference between the clock signals $C_1$, $C_n$ being smaller than one period of the image scanning clock signal, and one of the clock signals $C_1$ through $C_n$ is selected dependent on the output signal from a light sensor and used as the image scanning clock signal. The value $\Delta t_0$ is treated as a constant since it is assumed in the 1/N method that there is no tap-to-tap delay error in the delay element.

Figure 2:
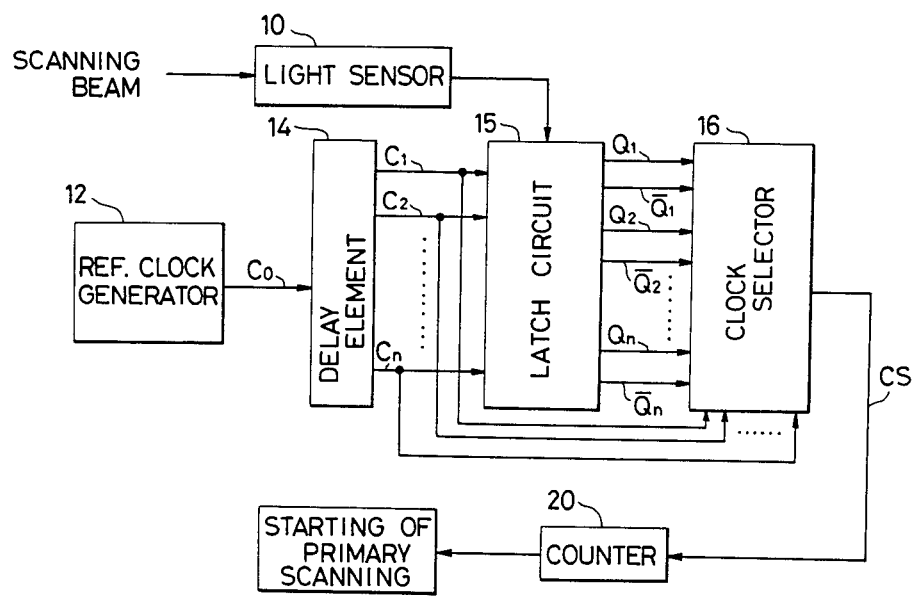

As shown in FIG. 2, a reference clock signal $C_0$ is generated by a reference clock generator 12, the reference clock signal $C_0$ having a period $T_0$ and a frequency $1/T_0$ which is the same as that of an image scanning clock signal.

The reference clock signal $C_0$ is applied to a delay element 14 which then produces clock signals $C_1$ through $C_n$ each having the period $T_0$.

Figure 3:
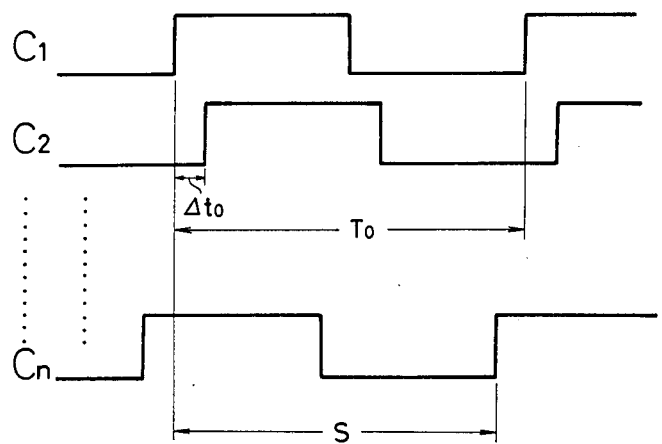

As illustrated in FIG. 3, the clock signals $C_1$ through $C_n$ are successively delayed $\Delta t_0$ in phase. The phase difference S between the clock signals $C_1$, $C_n$ is therefore expressed as $(n-1)\Delta t_0$, which must be smaller than one period of the image scanning clock signal, i.e., $S=(n-1)\Delta t_0<T_0$. This requirement will be described later on. The clock signals $C_1$ through $C_n$ are then applied to a latch circuit 15, as shown in FIG. 2.

When a light sensor 10 detects a scanning beam, it applies an output signal to the latch circuit 15, which is responsive to the leading edge of the applied signal for latching the clock signals $C_1$ through $C_n$ and issuing output signals $Q_1$ through $Q_n$ and $\overline{Q}_1$ through $\overline{Q}_n$.

The output signals $Q_i$ ($i=1$ through n), $\overline{Q}_i$ ($i=1$ through n) are 1, 0, respectively, when the latched clock signals $C_i$ ($i=1$ through n) are high, and are 0, 1, respectively, when the latched clock signals $C_i$ ($i=1$ through n) are low.

The output signals $Q_i$, $\overline{Q}_i$ ($i=1$ through n) from the latch circuit 15 are applied to a clock selector 16 which is also suppied with the clock signals $C_1$ through $C_n$ from the delay element 14. Based on the applied signals $C_i$, $Q_i$, $\overline{Q}_i$ ($i=1$ through n), the clock selector 16 selects one of the clock signals $C_1$ through $C_n$ according to a certain formula, and issues the selected clock signal as an image scanning clock signal CS. Clock pulses of the image scanning clock signals CS are counted by a counter 20. When a predetermined number of clock pulses are counted by the counter 20, a primary scanning cycle is started by a scanning beam.

One example in which $n=6$ will be described below.

Figure 4:
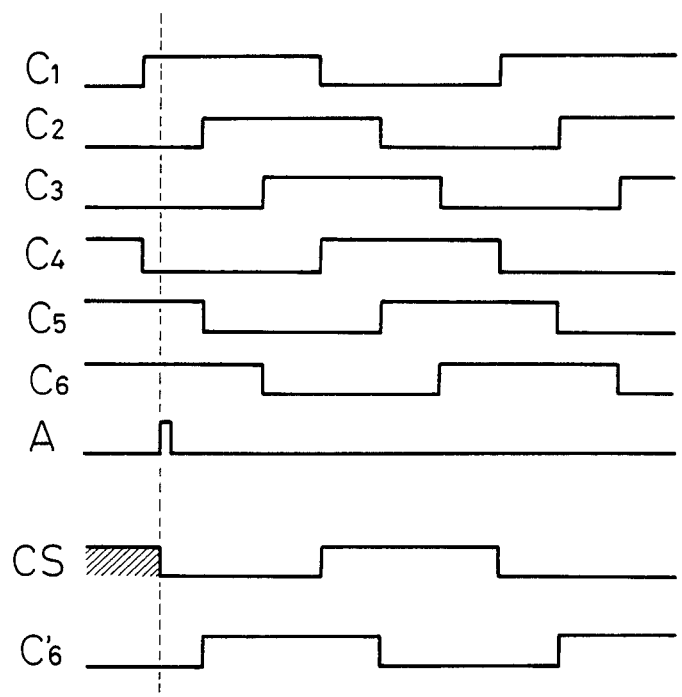

It is assumed that the delay element 14 issues clock signals $C_1$ through $C_6$ as shown in FIG. 4. If the light sensor 10 generates an output signal A, then the clock signals $C_1$ through $C_6$ as latched by the leading edge of the output signal A are high, low, low, low, high, and high, respectively. Therefore, the output signals from the latch circuit 15 are as follows: $Q_1=1$, $\overline{Q}_1=0$, $Q_2=0$, $\overline{Q}_2=1$, $Q_3=0$, $\overline{Q}_3=1$, $Q_4=0$, $\overline{Q}_4=1$, $Q_5=1$, $\overline{Q}_5=0$, $Q_6=1$, $\overline{Q}_6=0$.

The clock selector 16 produces an output signal $Q_i \cdot \overline{Q}_{i+1}$ or $\overline{Q}_i \cdot Q_{i+1}$ from the signals $Q_i$, $\overline{Q}_i$. The status of the signals when $i=6$ is shown in the following table:

| i | $Q_i$ | $\overline{Q}_i$ | $Q_i \cdot \overline{Q}_{i+1}$ |
|---|---|---|---|
| 1 | 1 | 0 | 1 |
| 2 | 0 | 1 | 0 |
| 3 | 0 | 1 | 0 |
| 4 | 0 | 1 | 0 |
| 5 | 1 | 0 | 0 |
| 6 | 1 | 0 | 0 |

This table indicates that the value of $Q_i \cdot \overline{Q}_{i+1}$ is 1 only when $i=1$ and is 0 when i is of the other values. This means that the leading edge of the output signal A from the light sensor 10 is present within the time period $\Delta t_0$ after the clock signal $C_1$ goes high and before the clock signal $C_2$ goes high, as clearly be seen from FIG. 4.

The jth clock signal $C_{i+j}$ counting from the value of i at which $Q_i \cdot Q_{i+1}$ becomes 1 (i=1 in the example of FIG. 4) is selected as the image scanning clock signal CS. Selection of the value of J is a matter of design choice. In the example of FIG. 4, the value of J is selected as 3, and the clock signal $C_4$ is selected as the image scanning clock signal when the output signal A from the light sensor 10 is as illustrated. Therefore, one clock signal is selected dependent on the output signal from the light sensor 10.

The requirement $S=(n-1)\Delta t_0 < T_0$, i.e., the phase difference between the clock signals $C_1$, $C_n$ be smaller than one period of the image scanning clock signal, will be described. If this requirement were not met in the example of FIG. 4, e.g., if the last clock signal were $C'_6$ instead of $C_6$, then $Q_6=0$, $\overline{Q_6}=1$, and hence $Q_5 \cdot \overline{Q_6}=1$. Therefore, $Q_i \cdot Q_{i+1}$ would be 1 for both i=1 and i=5. Thus, the output signal A of the light sensor 10 and the clock signals $C_1$ through $C_6$ would not be uniquely interrelated, with a resulting error.

The requirement $S=(n-1)\Delta t_0 < T_0$ is consequently to determine the time at which the output signal is to be issued from the light sensor uniquely in relation to the clock signals $C_1$ through $C_n$.

When selecting the image scanning clock signal CS in the foregoing manner, the maximum variation in time from the detection of the scanning beam with the light sensor up to the starting of the primary scanning is $\Delta t_0$, and since $(n-1)\Delta t_0 < T_0$, $$\Delta t_0 < \frac{T_0}{n-1} = \frac{T_0}{N} \quad (N = n - 1)$$

Whereas the starting position for a primary scanning cycle could deviate at most one pixel if the 1/N method were not relied upon, the maximum variation can be reduced to a 1/N pixel or less according to the 1/N method.

The clock selector which, on the assumption of j=3, selects the third clock signal $C_{i+3}$ from the value of i at which $Q_i \cdot Q_{i+1}=1$ can be implemented by a combination of AND gates and an OR gate as shown in FIG. 5.

The 1/N method has been outlined as described above.

It has been assumed in the above description that the successive phase difference $\Delta t_0$ between the n clock signals $C_1$ through $C_n$ produced from the delay element 14 is constant. However, an actual delay element is subject to a tap-to-tap delay error $\alpha(\%)$. Even if the tap-to-tap delay time is set to $\Delta t_0$, therefore, the phase delay varies in the range of $\Delta t = \Delta t_0 \pm \alpha \cdot (\Delta t_0/100)$ due to the tap-to-tap delay error when the n clock signals $C_1$ through $C_n$ are produced. In the presence of the tap-to-tap delay error, the 1/N method is theoretically inaccurate and the upper limit for the value of N in the 1/N method is at most N=3 as described above.

If $N \geq 3$, the tap-to-tap delay error $\alpha$ becomes $\alpha \leq 33\%$ from the formulas:

$$\frac{100 + n\alpha}{100 n + \alpha} \leq \frac{1}{3}, \quad \lim_{n \to \infty} \frac{100(n-3)}{3n-1} = \frac{100}{3}$$

According to the present invention, $N \geq 3$ since any positional variation in primary scanning starting positions are supposed to be smaller than a ⅓ pixel, and therefore a delay element in which the tap-to-tap delay error $\pm\alpha(\%)$ is $\alpha \leq 33$ is employed.

A method according to the present invention will be described in detail.

Designated in FIG. 6 at $C_1, C_2, \ldots, C_n$ are clock signals produced from the delay element, A an output signal from the light sensor, and CS an image scanning clock signal, as with FIG. 3. The clock signals $C_1$ through $C_n$ have the same frequency $1/T_0$ as that of the image scanning clock signal CS.

The phase delays $\Delta t$ between the clock signals $C_1, C_2, \ldots, C_n$ are not constant but vary within an error range due to a tap-to-tap delay error $\alpha$. Denoted at $S_0$ at a phase difference between the clock signals $C_1$ and $C_n$, and $T_0 - S_0$ is expressed as $\Delta T_E$, which can be $T_0 - (n-1)\Delta t_0$ if the error $\alpha$ is 0.

The third clock signal $C_{i+3}$ counting from the value of i at which $Q_i \cdot Q_{i+1} - 1$ is selected as the image scanning clock signal (Inasmuch as the leading edge of the output signal A is positioned between the positive-going edges of the clock signals $C_2$, $C_3$ in FIG. 6, $Q_i \cdot Q_{i+1}=1$ for i=2, and hence 2+3=5. Therefore, the clock signal $C_5$ is selected as the image scanning clock signal).

It is assumed that the time difference between the leading edge of the output signal A and the image scanning clock signal CS is DT, the maximum and minimum values thereof being DTL and DTS, respectively, and $T_0/\Delta t_0=K$ which is a delay time setting coefficient.

The above symbols are summarized as follows, with units indicated in parentheses:

$T_0$ (ns) . . . the period of the image scanning clock signal;

$\Delta t$ (ns) . . . the delay time (successive phase delays of the clock signals);

$\pm\alpha(\%)$ . . . the tap-to-tap delay error of the delay element;

n . . . the number of the clock signals, $\Delta T_E$ (ns) . . . the time between the clock signals $C_n$, $C_1$;

$S_0$ . . . the phase difference between the clock signals $C_1$, $C_1$, $\Delta T_E = T_0 - S_0$;

DT . . . the time between the leading edge of the output signal of the light sensor and the image scanning clock signal;

DTL . . . the maximum value of DT;

DTS . . . the minimum value of DT;

$K = T_0/\Delta t_0$ . . . the delay time setting coefficient;

$\Delta t_0$ . . . the delay time when there is no error.

In order to uniquely determine the value of i at which $Q_i \cdot \overline{Q}_{i+1}=1$, the condition of $S_0 < T_0$ is required to be met, or stated otherwise, the condition of $\Delta T_E > 0$ should be met.

In view of the tap-to-tap delay error $\pm\alpha(\%)$, the relationship $$(1 - \alpha/100)\Delta t_0 \leq \Delta t \leq (1 + \alpha/100)\Delta t_0$$

is established.

There are $(n-1)\Delta t$'s between the clock signals $C_1$ and $C_n$, and it is assumed that there are a $\Delta t$'s which are $\Delta t \geq \Delta t_0$ and b$\Delta t$'s which are $\Delta t \leq \Delta t_0$, among these $(n-1)\Delta t$'s, with $a+b=n-1$. Since $S_0 = \Sigma \Delta t$, $$\Delta T_E = T_0 - S_0 = T_0 - \{(1+\alpha/100)a + (1-\alpha/100)b\}\Delta t_0 \quad (1)$$

Since the variations in the primary scanning starting positions correspond to variations in DT, the line synchronizing accuracy E in optical scanning is expressed by:

$$E = \frac{DTL - DTS}{T_0} \times 100 \, (\%) \quad (2)$$

Because $\Delta T_E$ must always be positive, $$T_0 > \{(1+\alpha/100)a + (1-\alpha/100)b\}\Delta t_0 \quad (3)$$

from the equation (1).
As $T_0/\Delta t_0 = K$, $$K > (1+\alpha/100)a + (1-\alpha/100)b$$

The value of the righthand side of the above inequality is at maximum when $a = n-1$ and $b = 0$. In view of this, $$K > (n-1)(1+\alpha/100) \quad (4)$$

Where the image scanning clock signal CS is selected as shown in FIG. 6, DTM (the maximum value of DTL−DTS) which gives the maximum value to E is given as follows:

(a) For $0 < \Delta T_E \leq \left(1 - \frac{\alpha}{100}\right) \Delta t_0$:

(1) When $a = 0$, $b = n - 1$, $$DTL = \left(1 - \frac{\alpha}{100}\right) \Delta t_0 \times 3$$

$$DTS = \left(1 - \frac{\alpha}{100}\right) \Delta t_0 + \Delta T_E$$

$$\Delta DTM = (n + 1)\left(1 - \frac{\alpha}{100}\right) \Delta t_0 - T_0 \quad (5)$$

(2) When $a = 1$, $b = n - 2$, $$DTL = \left(1 + \frac{\alpha}{100}\right) \Delta t_0 + \left(1 - \frac{\alpha}{100}\right) \Delta t_0 \times 2$$

$$DTS = \left(1 - \frac{\alpha}{100}\right) \Delta t_0 + \Delta T_E$$

$$\Delta DTM = \left\{ n + 1 - \left(n - 3\frac{\alpha}{100}\right) \right\} \Delta t_0 - T_0 \quad (6)$$

(3) When $a = 2$, $b = n - 3$, $$DTL = \left(1 + \frac{\alpha}{100}\right) \Delta t_0 \times 2 + \left(1 - \frac{\alpha}{100}\right) \Delta t_0$$

$$DTS = \left(1 - \frac{\alpha}{100}\right) \Delta t_0 + \Delta T_E$$

$$\Delta DTM = \left\{ n + 1 - \left(n - 7\frac{\alpha}{100}\right) \right\} \Delta t_0 - T_0 \quad (7)$$

(4) When $a \geq 3$, $b \geq 1$,

-continued $$DTL = \left(1 + \frac{\alpha}{100}\right) \Delta t_0 \times 3$$

$$DTS = \left(1 - \frac{\alpha}{100}\right) \Delta t_0 + \Delta T_E$$

$$\Delta DT = DTL - DTS = \left\{ 2 + \frac{4\alpha}{100} + \left(1 + \frac{\alpha}{100}\right) a + \left(1 - \frac{\alpha}{100}\right) b \right\} \Delta t_0 - T_0$$

The value of $\Delta DT$ is maximum when $a = n-2$, $b = 1$. Therefore, $$\Delta DTM = (n + 1)\left(1 + \frac{\alpha}{100}\right) \Delta t_0 - T_0 \quad (8)$$

(5) When $a = 1$, $b = 0$, $$DTL = \left(1 + \frac{\alpha}{100}\right) \Delta t_0 \times 3$$

$$DTS = \left(1 + \frac{\alpha}{100}\right) \Delta t_0 + \Delta T_E$$

$$\Delta DTM = (n + 1)\left(1 + \frac{\alpha}{100}\right) \Delta t_0 - T_0 \quad (8)$$

(b) For $\left(1 - \frac{\alpha}{100}\right) \Delta t_0 < \Delta T_E \leq \left(1 + \frac{\alpha}{100}\right) \Delta t_0$:

(1) When $a = 0$, $b = n - 1$, $$DTL = \left(1 - \frac{\alpha}{100}\right) \Delta t_0 \times 2 + \Delta T_E$$

$$DTS = \left(1 - \frac{\alpha}{100}\right) \Delta t_0 \times 2$$

$$\Delta DTM = T_0 - (n - 1)\left(1 - \frac{\alpha}{100}\right) \Delta t_0 \quad (9)$$

(2) When $a = 1$, $b = n - 2$, $$DTL = \left(1 + \frac{\alpha}{100}\right) \Delta t_0 + \left(1 - \frac{\alpha}{100}\right) \Delta t_0 + \Delta T_E$$

$$DTS = \left(1 - \frac{\alpha}{100}\right) \Delta t_0 \times 2$$

$$\Delta DTM = T_0 - (n - 1)\left(1 - \frac{\alpha}{100}\right) \Delta t_0 \quad (9)$$

(3) When $a = 2$, $b = n - 3$, $$DTL = \left(1 + \frac{\alpha}{100}\right) \Delta t_0 \times 2 + \Delta T_E$$

-continued $$DTS = \left(1 - \frac{\alpha}{100}\right) \Delta t_0 \times 2$$

$$\Delta DTM = T_0 - (n-1)\left(1 - \frac{\alpha}{100}\right) \Delta t_0$$

(4) When $a \geq 3, b \geq 2$, $$DTL = \left(1 + \frac{\alpha}{100}\right) \Delta t_0 \times 3$$

$$DTS = \left(1 - \frac{\alpha}{100}\right) \Delta t_0 \times 2$$

$$\Delta DTM = \left(1 + \frac{5\alpha}{100}\right) \Delta t_0$$

(5) When $a = n - 2, b = 1$, $$DTL = \left(1 + \frac{\alpha}{100}\right) \Delta t_0 \times 3$$

$$DTS = \left(1 - \frac{\alpha}{100}\right) \Delta t_0 + \Delta T_E$$

$$\Delta DTM = (n+1)\left(1 + \frac{\alpha}{100}\right) \Delta t_0 - T_0$$

(6) When $a = n - 1, b = 0$, $$DTL = \left(1 + \frac{\alpha}{100}\right) \Delta t_0 \times 3$$

$$DTS = \left(1 - \frac{\alpha}{100}\right) \Delta t_0 + \Delta T_E$$

$$\Delta DTM = (n+1)\left(1 + \frac{\alpha}{100}\right) \Delta t_0 - T_0$$

(c) For $\left(1 + \frac{\alpha}{100}\right) \Delta t_0 \leq \Delta T_E$:

(1) When $a = 0, b = n - 1$, $$DTL = \left(1 - \frac{\alpha}{100}\right) \Delta t_0 \times 2 + \Delta T_E$$

$$DTS = \left(1 - \frac{\alpha}{100}\right) \Delta t_0 \times 2$$

$$\Delta DTM = T_0 - (n-1)\left(1 - \frac{\alpha}{100}\right) \Delta t_0 \quad (12)$$

(2) When $a = 1, b = n - 2$, $$DTL = \left(1 + \frac{\alpha}{100}\right) \Delta t_0 + \left(1 - \frac{\alpha}{100}\right) \Delta t_0 + \alpha T_E$$

$$DTS = \left(1 - \frac{\alpha}{100}\right) \Delta t_0 \times 2$$

$$\Delta DTM = T_0 - (n-1)\left(1 - \frac{\alpha}{100}\right) \Delta t_0 \quad (12)$$

(3) When $a \geq 2, b \geq 2$, $$DTL = \left(1 + \frac{\alpha}{100}\right) \Delta t_0 \times 2 + \Delta T_E$$

$$DTS = \left(1 - \frac{\alpha}{100}\right) \Delta t_0 \times 2$$

$$\Delta DT = T_0 +$$

$$\left\{\frac{4\alpha}{100} - \left(1 + \frac{\alpha}{100}\right)a + \left(1 - \frac{\alpha}{100}\right)b\right\} \Delta t_0$$

The value of $\Delta DT$ is maximum when $a = 2, b = n - 3$.

$$\Delta DTM = T_0 - (n-1)\left(1 - \frac{\alpha}{100}\right) \Delta t_0 \quad (12)$$

(4) When $a = n - 2, b = 1$, $$DTL = \left(1 + \frac{\alpha}{100}\right) \Delta t_0 \times 2 + \Delta T_E$$

$$DTS = \left(1 + \frac{\alpha}{100}\right) \Delta t_0 + \left(1 - \frac{\alpha}{100}\right) \Delta t_0$$

$$\Delta DTM = T_0 - (n-1)\left(1 - \frac{\alpha}{100}\right) \Delta t_0 \quad (12)$$

(5) When $a = n - 1, b = 0$, $$DTL = \left(1 + \frac{\alpha}{100}\right) \Delta t_0 \times 2 + \Delta T_E$$

$$DTS = \left(1 + \frac{\alpha}{100}\right) \Delta t_0 \times 2$$

$$\Delta DTM = T_0 - (n-1)\left(1 - \frac{\alpha}{100}\right) \Delta t_0 \quad (12)$$

Since $T_0/\Delta t_0 = K$, the line synchronizing accuracy E and the delay time setting coefficient K are interrelated as follows, using the equations (2) and (8) through (12):

(I) For $0 < \Delta T_E \leq \left(1 - \frac{\alpha}{100}\right) \Delta t_0$:

$$\frac{E}{100} = (n+1)\left(1 + \frac{\alpha}{100}\right) / K - 1 \quad (13)$$

$$(a \geq 3)$$

(II)

For $\left(1 - \frac{\alpha}{100}\right) \Delta t_0 < \Delta T_E \leq \left(1 + \frac{\alpha}{100}\right) \Delta t_0$:

$$\frac{E}{100} = -(n-1)\left(1 - \frac{\alpha}{100}\right)/K - 1 \quad (14)$$

$(a = 0, 1, 2)$ $$\frac{E}{100} = \left(1 + \frac{5}{100}\right)/K \quad (15)$$

$(a \geq 3, b \geq 2)$ $$\frac{E}{100} = (n+1)\left(1 + \frac{\alpha}{100}\right)/K - 1 \quad (16)$$

$(b = 0, 1)$ (III)

For $\left(1 - \frac{\alpha}{100}\right) \Delta t_0 < \Delta T_E$:

$$\frac{E}{100} = -(n-1)\left(1 - \frac{\alpha}{100}\right)/K - 1 \quad (17)$$

The equations (13) and (16) are the same as each other and the equations (14) and (17) are the same as each other.

Figure 1A:
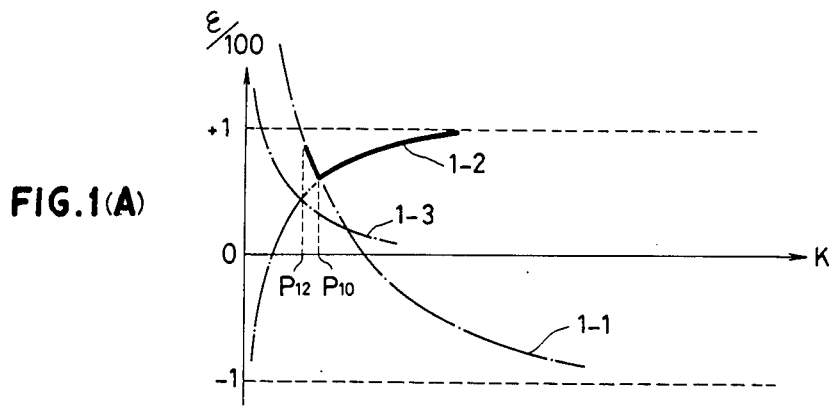
FIGS. 1(A) thorugh (E) are diagrams explanatory of a method according to the present invention.
Figure 1B:
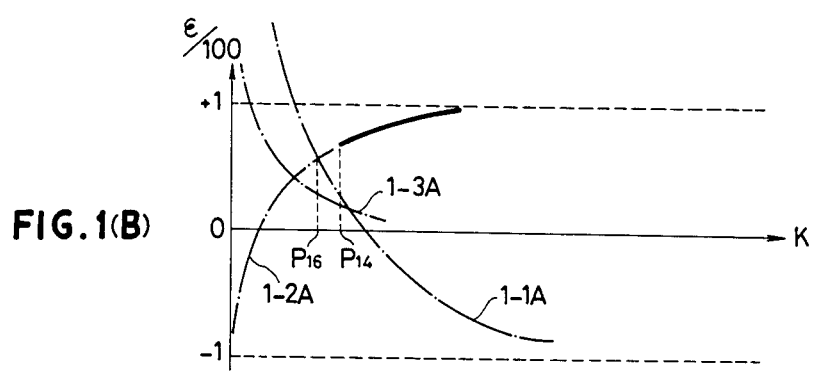
Figure 1C:
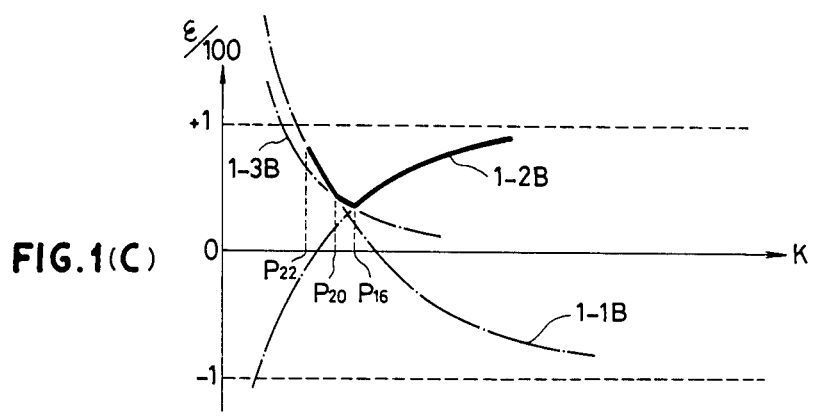

In FIGS. 1(I) through (V), the curves 1—1, 1-1A, 1-1B, and 1-1C are represented by the equations (13), (16), the curves 1-2, 1-2A, 1-2B, 1-2C, and 1-2D by the equations (14), (17), and the curves 1-3, 1-3A, and 1-3B by the equation (15).

Figure 1:
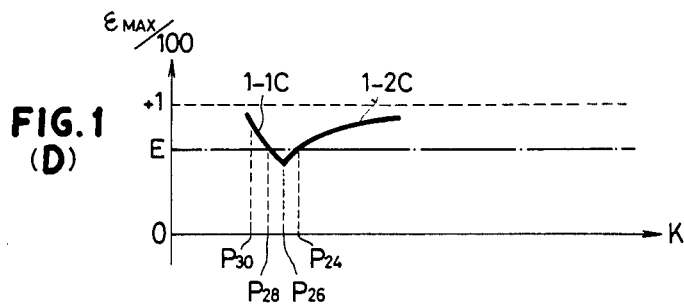
Figure 1:
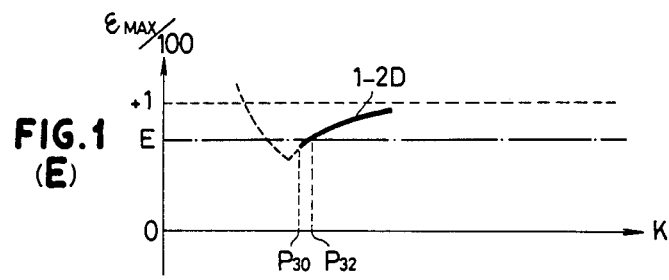

In view of the equation (4), the thicker portions of the curves in FIGS. 1(I) through 1(III) indicate the line synchronizing accuracies under the respective conditions.

In FIG. 1(I), the point $P_{10}$ represents $K = n + (\alpha/100)$, and the point $P_{12}$ represents $K = (n-1)\{1 + (\alpha/100)\}$. FIG. 1(I) shows the curve in the range of $$5 \leq n < 2 + 100/\alpha$$

for $0 < \alpha \leq 33$. The maximum value Emax of the line synchronizing accuracy at this time is:

$$\begin{aligned} E\max &= \left\{(n+1)\left(1 + \frac{\alpha}{100}\right)/K - 1\right\} \times 100 \\ &\text{when } (n-1)\left(1 + \frac{\alpha}{100}\right) < K < n + \frac{\alpha}{100}, \text{ and} \\ E\max &= \left\{-(n-1)\left(1 - \frac{\alpha}{100}\right)/K + 1\right\} \times 100 \\ &\text{when } n + \frac{\alpha}{100} \leq K. \end{aligned} \quad (18)$$

FIG. 1(II) shows the curve in the range of $2 + (100/\alpha) \leq n$. In FIG. 1(II), the point $P_{14}$ indicates $K = (n-1)\{1 + (\alpha/100)\}$ and the point $P_{16}$ indicates $K = n + (\alpha/100)$. At this time, Emax for $0 < \alpha \leq 33$ is expressed by:

$$\begin{aligned} E\max &= \left\{-(n-1)\left(1 - \frac{\alpha}{100}\right)/K + 1\right\} \times 100 \\ &\text{when } (n-1)\left(1 + \frac{\alpha}{100}\right) < K \end{aligned} \quad (19)$$

FIG. 1(III) shows the curve 1-3B is present in the range $2 \leq n \leq 4$. In FIG. 1(III), the point $P_{18}$ indicates $K = n + \{(6-n)\alpha/100\}$, the point $P_{20}$ indicates $K = n + \{(4-n)\alpha/100\}$, and the point $P_{22}$ indicates $K = (n-1)\{1 + (\alpha/100)\}$. Since $a \geq 3$, $b \geq 2$ in the equation (15), the curve 1-3B is not present in the range of $2 \leq n \leq 4$, and Emax at this time is given by the equation (18).

Now, the condition under which $E\max \leq (1/N) \times 100$ for $5 \leq n < 2 + (100/\alpha)$ and $2 + (100/\alpha) \leq n$ in FIGS. 1(I) and 1(II) will be determined below. When this condition is met, the positional error of the primary scanning starting position is 1/N of one pixel or less.

Reference will be made to FIGS. 1(IV) and 1(V) for determining the above condition.

FIG. 1(IV) shows the curve in the range of $5 \leq n < 2 + (100/\alpha)$. The points $P_{24}$, $P_{26}$, $P_{28}$, and $P_{30}$ indicate $$K = \frac{1 - \frac{\alpha}{100}}{1 - E}(n-1), K = n + \frac{\alpha}{100},$$

$$K = \frac{1 + \frac{\alpha}{100}}{1 + E}(n+1), \text{ and } K = (n-1)\left(1 + \frac{\alpha}{100}\right),$$

respectively, where E is Emax/100.

The condition which meets $E\max \leq (1/N) \times 100$ in the equation (18) is:

$$\frac{1 + \frac{\alpha}{100}}{1 + \frac{1}{N}}(n+1) \leq K < \frac{1 - \frac{\alpha}{100}}{1 - \frac{1}{N}}(n-1) \quad (20)$$

when $\frac{100 + n\alpha}{100n + \alpha} \leq \frac{1}{N} \leq \frac{2}{n-1}$ and $$(n-1)\left(1 + \frac{\alpha}{100}\right) < K \leq \frac{1 - \frac{\alpha}{100}}{1 - \frac{1}{N}}(n-1) \quad (21)$$

when $\frac{2}{n-1} \leq \frac{1}{N}$

FIG. 1(V) shows the curve in the range of $2 + (100/\alpha) \leq n$. Providing $E = E\max/100$, the point $P_{32}$ indicates $$K = \frac{1 - \frac{\alpha}{100}}{1 + E}(n-1),$$

and the point $P_{34}$ indicates $K = (n-1)\{1 + (\alpha/100)\}$.

The condition which meets $E\max \leq (1/N) \times 100$ in the equation (19) is:

$$(n-1)\left(1+\frac{\alpha}{100}\right) < K \leq \frac{1-\frac{\alpha}{100}}{1-\frac{1}{N}}(n-1) \tag{22}$$

when $\frac{2\alpha}{\alpha+100} \leq \frac{1}{N} < 1$

Since $\Delta t_0 = T_0/K$, this relationship is used, and the expressions (20), (21), (22) are modified into the following expressions (23), (24), (25), respectively:

$$\frac{\left(1-\frac{1}{N}\right)T_0}{\left(1-\frac{\alpha}{100}\right)(n-1)} \leq \Delta t_0 \leq \frac{\left(1+\frac{1}{N}\right)T_0}{\left(1+\frac{\alpha}{100}\right)(n+1)} \tag{23}$$

$$\frac{\left(1-\frac{1}{N}\right)T_0}{\left(1-\frac{\alpha}{100}\right)(n-1)} \leq \Delta t_0 < \frac{T_0}{\left(1+\frac{\alpha}{100}\right)(n-1)} \tag{24}$$

$$\frac{\left(1-\frac{1}{N}\right)T_0}{\left(1-\frac{\alpha}{100}\right)(n-1)} \leq \Delta t_0 < \frac{T_0}{\left(1+\frac{\alpha}{100}\right)(n-1)} \tag{25}$$

Therefore, $\Delta t_0$ which meets the expression (23) when $1/N$ and $\alpha$ meet $$\frac{100+n\alpha}{100n+\alpha} \leq \frac{1}{N} < \frac{2}{n-1}$$

in the range of $5 \leq n < 2 + (100/\alpha)$,
which meets the expression (24) when $$2/(n-1) \leq 1/N$$

is met in the range of $5 \leq n < 2 + (100/\alpha)$, and which meets the expression (25) when $$2\alpha/(\alpha+100) \leq 1/N < 1$$

is met in the range of $2 + (100/\alpha) \leq n$, should be selected as a tap-to-tap delay time of the delay element. By aligning the primary scanning starting positions with the image scanning clock signal thus produced, any positionan error of the primary scanning starting positions can be reduced to a 1/N pixel or smaller.

EXAMPLE

An example of the present invention will be described below. A reference clock signal having an image scanning clock frequency of 5 MHz and a clock period of $T_0 = 200$ ns was generated, and $\alpha = 10\%$, $n = 10$, and a maximum line synchronizing accuracy of 1/5 pixel or less were selected as design conditions.

Since $n = 10$ and $\alpha = 10$, the relationship $$\frac{100+n\alpha}{100n+\alpha} \leq \frac{1}{N} < \frac{2}{n-1}$$

is met, and hence from the relationship (24), the condition to be met by $\Delta t_0$ is:

$$19.76 \text{ (ns)} < \Delta t_0 < 19.83 \text{ (ns)} \tag{26}$$

Since Emax is minimum when $K = n + (\alpha/100) = 10.1$ as is clear from FIG. 1(IV), 19.80 (ns) may be selected as $\Delta t_0$ ($=T_0/K$). By selecting the actual tap-to-tap delay time $\Delta t_0$ of the delay element to be 19.80 (ns), any positional variation of the primary scanning starting positions could be 1/5 pixel or smaller.

With the method of the present invention, therefore, any error or positional variation of the primary scanning starting positions can be reduced effectively at all times regardless of the presence of a tap-to-tap delay error in a delay element, and therefore the optical scanning can be of increased accuracy.

Although a certain preferred embodiment has been shown and described, it should be understood that many changes and modifications may be made therein without departing from the scope of the appended claim.

What is claimed is:

1. A method of generating image scanning clock signals in an optical scanning device in which an object is scanned over a scanning region with a light beam cyclically deflected by a rotating light deflector, and the scanning beam is detected by a light sensor located out of the scanning region for synchronizing primary scanning, said method comprising the steps of:

producing n clock signals $C_1$ through $C_n$ with a delay element from an image scanning clock signal and a reference clock signal having the same frequency as that of the image scanning clock signal, said clock signals $C_1$ through $C_n$ being successively delayed by phase differences t with the phase difference between the clock signals $C_1$, $C_n$ being smaller than one period of said image scanning clock signal;

selecting one of said clock signals $C_1$ through $C_n$ as the image scanning clock signal dependent on an output signal from said light sensor; and selecting, as a tap-to-tap delay time of said delay element, $\Delta t_0$ which meets:

$$\frac{\left(1-\frac{1}{N}\right)T_0}{\left(1-\frac{\alpha}{100}\right)(n-1)} \leq \Delta t_0 \leq \frac{\left(1+\frac{1}{N}\right)T_0}{\left(1+\frac{\alpha}{100}\right)(n+1)} \tag{i}$$

when $$\frac{100+n\alpha}{100n+\alpha} \leq \frac{1}{N} < \frac{2}{n-1}$$

in the range of $5 \leq n \leq 2 + (100/\alpha)$, and $$\frac{\left(1-\frac{1}{N}\right)T_0}{\left(1-\frac{\alpha}{100}\right)(n-1)} \leq \Delta t_0 < \frac{T_0}{\left(1+\frac{\alpha}{100}\right)(n-1)}$$

when $$\frac{2}{n-1} \leq \frac{1}{N}$$

in the range of $5 \leq n \leq 2 + (100/\alpha)$, and (ii)

$$\frac{\left(1-\frac{1}{N}\right)T_0}{\left(1-\frac{\alpha}{100}\right)(n-1)} \leqq \Delta t_0 < \frac{T_0}{\left(1+\frac{\alpha}{100}\right)(n-1)}$$

when $$\frac{2\alpha}{\alpha+100} \leqq \frac{1}{N} < 1,$$

where the tap-to-tap delay error of the delay element is expressed by $\pm\alpha\%$ ($0<\alpha\leqq 33$), the maximum error of an image scanning position is given as a 1/N pixel (N is a natural number), and the period of the image scanning clock signal is expressed as $T_0$.

* * * * *